April 7, 1953 F. W. DIETSCH ET AL 2,633,742
KINETIC TORSION TESTING MACHINE
Filed Sept. 5, 1951 3 Sheets-Sheet 1

INVENTOR.
FRANCIS W. DIETSCH.
C. WALTON MUSSER.
ALBERT M. STOTT.
BY *G. J. Kessenich, A. W. Dew and H. J. Forman*
ATTORNEYS

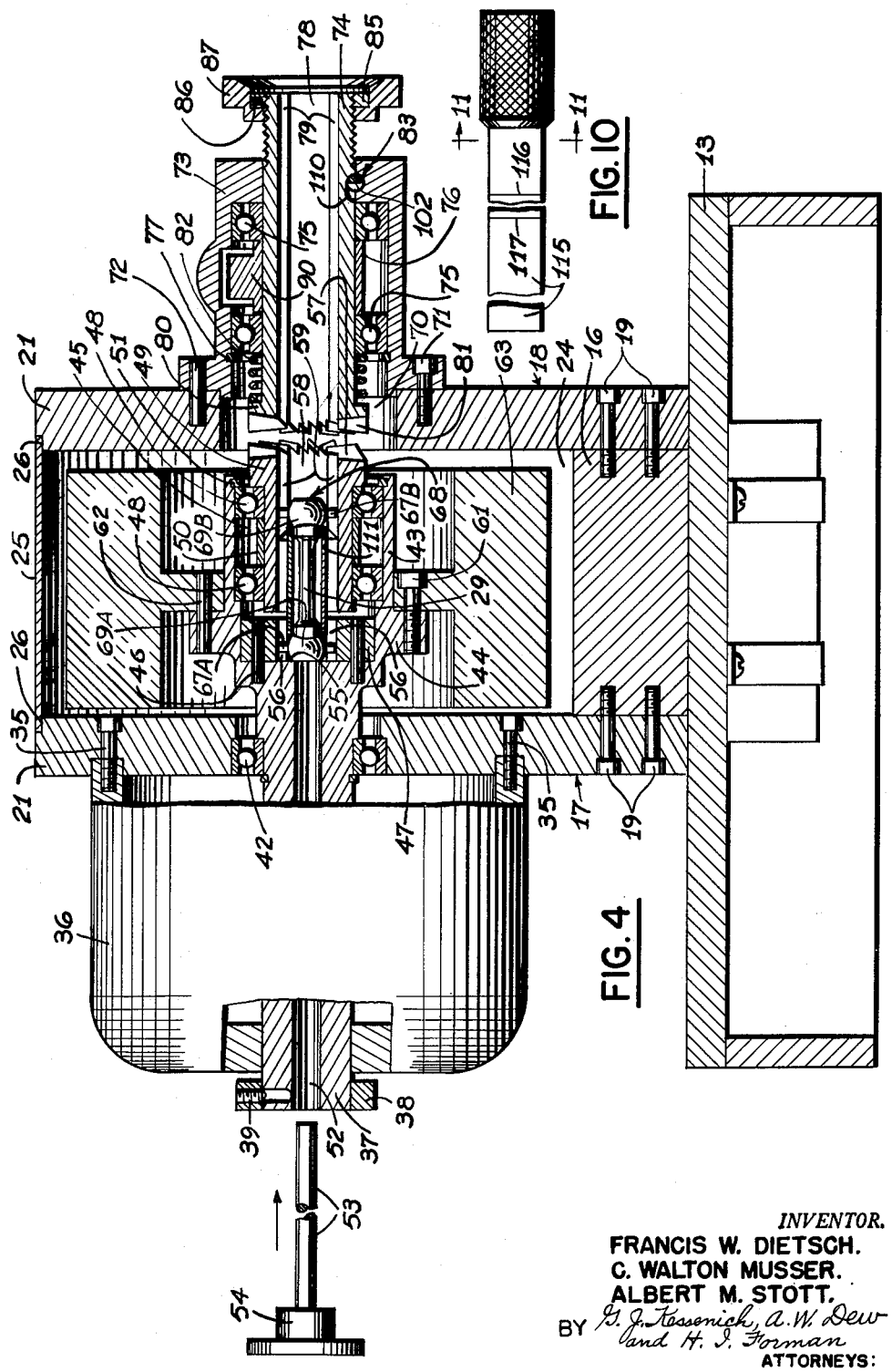

April 7, 1953     F. W. DIETSCH ET AL     2,633,742
KINETIC TORSION TESTING MACHINE
Filed Sept. 5, 1951     3 Sheets-Sheet 3
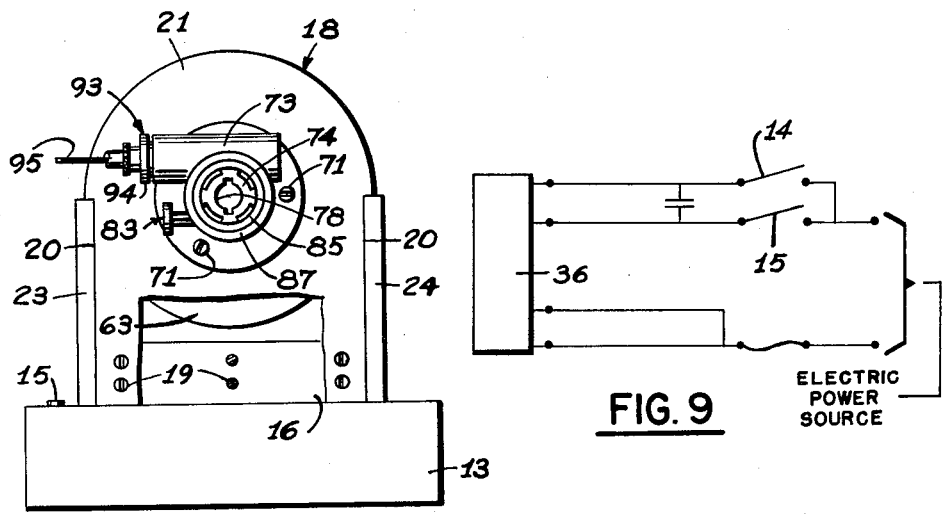
FIG. 5
FIG. 9
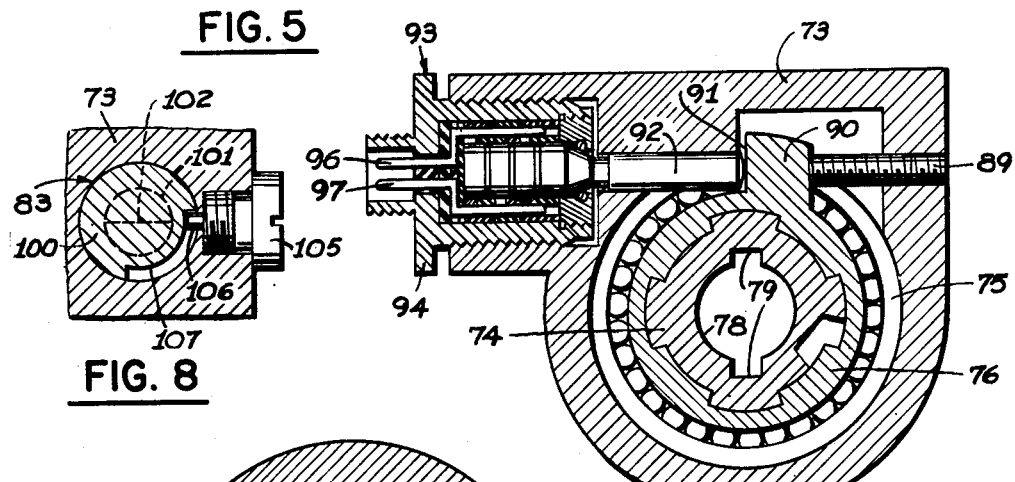
FIG. 8
FIG. 6
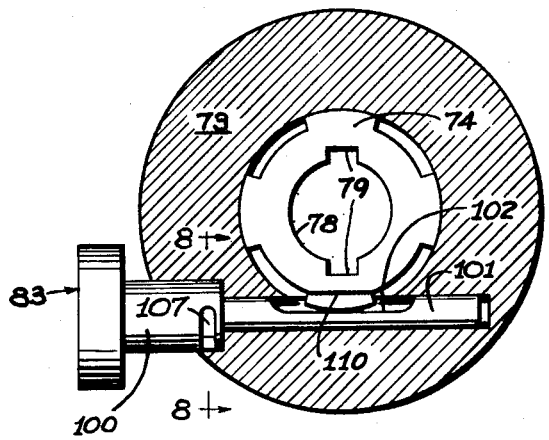
FIG. 7
*INVENTOR.*
FRANCIS W. DIETSCH.
C. WALTON MUSSER.
ALBERT M. STOTT.
BY *G. J. Kessenich, A. W. Dew
and H. J. Forman*
ATTORNEYS.

Patented Apr. 7, 1953

2,633,742

UNITED STATES PATENT OFFICE 2,633,742

KINETIC TORSION TESTING MACHINE

Francis W. Dietsch and C. Walton Musser, Philadelphia, and Albert M. Stott, Aldan-Clifton Heights, Pa.

Application September 5, 1951, Serial No. 245,225

6 Claims. (Cl. 73—99)

(Granted under Title 35, U. S. Code (1952), sec. 266)

The invention described herein may be manufactured and used by or for the Government for governmental purposes without the payment to us of any royalty thereon.

Our invention relates broadly to means for testing and measuring the ability of materials to withstand certain strains. In particular, it has reference to kinetic torsion testing machines (i. e., those in which a specimen to be tested is subjected to a torsional impact as distinguished from static torsion testing machines in which the specimen is subjected to a slowly increasing torque).

It is a well known practice, when desiring to test the physical strength of certain materials, to prepare from the material to be tested a specimen of standard size and shape according to the type of test to be performed. Thus, it has been customary to prepare specimens that are, for example, cylindrical in shape with ends adapted for easy fitting into and securing within the testing machine, or specimens that are of relatively flat cross section with an elongated hourglass shape. Many other specimen designs are known, but the prior art models as well as the conventional kinetic torsion testing machines in which they have been used, have been found to possess certain undesirable features which cause them to be inadequate in the light of the inventive concepts embraced in our novel apparatus.

In prior art machines of the kinetic torsion testing type, the customary practice has been to clamp one end of the conventionally shaped specimen to be tested in a close fitting recess contained in a non-rotating part of the testing machine, while the remainder of the specimen projects from the recess without support. In this manner of mounting the specimen to be tested in a close fitting recess, the specimen has area contact with the machine at only one end. To the unsupported, free end of the specimen to be tested, is clamped a torsion bar which extends radially outward from the specimen perpendicular the latter's axis.

In performing a kinetic torsion test with these machines and conventionally shaped specimens, a flywheel is caused to rotate at a predetermined initial velocity, thereby generating in the machine a known amount of kinetic energy. The flywheel is in alignment with the specimen holding recess and has opposed torsion bar lugs. As those skilled in the art know, this energy must be greater than the amount required to be spent in twisting the specimen apart. The specimen, to which the earlier mentioned torsion bar is attached, is then caused rapidly to slide axially toward the flywheel containing the torsion bar lugs. When the lugs on the flywheel contact the torsion bar attached to the test specimen, the specimen receives a torsional impact at the outer, unsupported, free end. Under influence of this applied torque, the specimen is torsionally deflected, or twisted, until it separates. Since the energy input of the machine is greater than the energy spent in breaking the specimen, the flywheel has some residual velocity after the specimen fails. A reading is made of this residual velocity, and, by comparing the difference between the initial and the residual velocities, computation of the specimen's torsional strength and of the energy required to break the specimen can be made by use of well known formulae. Through continual use during the years some artisans advocate that these computations are best made when the residual velocity of the flywheel is approximately twenty-five per cent (25%) of its initial velocity. This maxim, however, need not necessarily apply to our new kinetic torsion testing machine.

We have found that the prior art torsion testing machines possess certain disadvantages which prevent their being consistent, accurate, and sensitive. These disadvantages, we believe, can be attributed to the shape of the ends of the specimen, to the manner of accommodating the specimen in the testing machine which utilizes area contact between the two, to the clamping of the specimen in the testing machine which results directly in pre-loading the specimen, to the application of a torsional impact to the unsupported end of the specimen, and to axial bending of the specimen while undergoing the torsion test. All these factors result in the introduction of variable, indeterminate, extraneous forces which adulterate the data taken from the testing machine, and result in a fallacious determination of the physical properties sought.

In addition, prior art kinetic torsion testing machines indicate only a single value of the torsional resistance offered by the specimen without considering how that resistance may have fluctuated during the period of time the specimen was subjected to the torque. In other words, no means were devised to produce a "running" account of just how the applied torque, the specimen's resistance, and its torsional deflection may have varied from instant to instant from the time of application of the torque to the moment when the specimen failed. Engineers and stress analysts, in their studies of torsional strength, have long sought for a kinetic torsion machine which would enable them to follow closely the behavior of a torque and the specimen to which it was applied during the entire duration of the test. With our inventive kinetic torsion testing machine, it is now possible to know the magnitude of the applied torque, the energy expended on the specimen, as well as the torsional deflection of the specimen at any interval of time during the test. From this and subsequent explanation, it will be apparent that we have eliminated the undesirable attributes of prior art machines, and have introduced to the art inventive concepts not heretofore known.

In our novel kinetic torsion testing machine a uniquely shaped test specimen, later referred to, is accommodated throughout its length in a rotatable armature so that the specimen's axis is substantially congruous with that of the armature. One end of the specimen is rotatably driven by the armature and the other end is supported, but locked against rotation, in relation to a collar which rotatably and concentrically "floats" in the armature. By separate clutching means this sleeve can be rotatably locked or unlocked at will. By this arrangement, the collar is capable of rotating or not rotating independent of the armature's rotation.

In using our machine, a flywheel attached to the specimen-containing armature, and having a unique block pattern upon its periphery, is caused to rotate at a predetermined initial velocity. This velocity can be accurately determined, without consuming energy from the machine, by the use of stroboscopic light directed upon the flywheel's block pattern. The nature of this pattern, when viewed in the stroboscopic light, supplies a readily interpreted index of the flywheel's rotational velocity.

Torsional impact is applied to the axially rotating test specimen by abruptly arresting the rotation of the specimen collar containing one end of the specimen by means of an axially sliding clutch member. However, the armature, its attached parts, and the flywheel continue to rotate. This clutch member is provided with a spline-engaged dog and is so rotatable, by energy transmitted to it by the specimen, that the dog moves against a plunger. The plunger, in turn, presses against a calibrated piezo-electric gage where an electrical potential is established. This potential is proportional to the pressure exerted by the plunger on the piezoelectric gage and is fed, by convenient wiring, to an oscilloscope where its effect on the oscilloscope's electron beam is readily observed by the nature of the tracing on the oscilloscope's screen. The trace made by the electron beam can be generated against a background of horizontal and vertical ordinates so as to produce a torque vs. time curve which later can be analyzed and evaluated.

After failure of the specimen, the residual velocity of the flywheel is again noted by observing the appearance of its block pattern under stroboscopic light as earlier explained.

If desired, high speed photographic equipment can be trained on the flywheel and on the oscilloscope's screen in order to preserve, on film, a pictorial record of the actions occurring during the test.

In view of the above references to the prior art and our novel device, certain objects of our present invention will become apparent. For example, one object of our invention is to provide a kinetic torsion testing machine in which the specimen to be tested is not preloaded by clamping or other means of placing it into testing position in the machine.

Another object is to provide a kinetic torsion testing machine in which both ends of the specimen are supported in alignment with each other at all times.

Still another object is to provide a kinetic torsion testing machine in which there is line contact and universal-joint action between the machine and the ends of the specimen.

Yet another object is to provide a kinetic torsion testing machine having stroboscopic means for determining the initial and residual velocities of the machine's flywheel in order to determine its loss of energy during the test.

A further object is to provide a kinetic torsion testing machine having piezo-electric means for determining the character of the torsional moment applied to the specimen, and the amount of flywheel energy absorbed by the specimen, at any instant during the test.

A still further object is to provide a kinetic torsion testing machine in which the specimen is subjected only to torsional stress and strain.

The foregoing and other objects and advantages of our invention will become apparent from an inspection of the following description and the accompanying drawings wherein:

Fig. 4 is a sectional view of our machine taken along line 4—4 of Fig. 1 and showing, in particular, interior structural details thereof. Note that an ejector rod, not shown in Fig. 1, has been incorporated at the left portion of this figure;

Fig. 5 is an end view of our testing machine taken along line 5—5 of Fig. 2;

Fig. 6 is a vertical cross section taken along line 6—6 of Fig. 2 and showing the adaption of a piezo-electric measuring means to our machine;

Fig. 7 is a vertical cross section taken along line 7—7 of Fig. 2 and showing a clutch release mechanism associated with our machine;

Fig. 8 is a vertical section taken along line 8—8 of Fig. 7 and showing further details of the clutch release mechanism;

Fig. 9 is a schematic representation of the reversible electric motor and wiring therefor used in our novel machine;

Fig. 10 is a view of an aligning blade used in our testing machine. Because of the blade's length, portions thereof have been removed between the break lines.

Figures 1, 2, 3, 11:
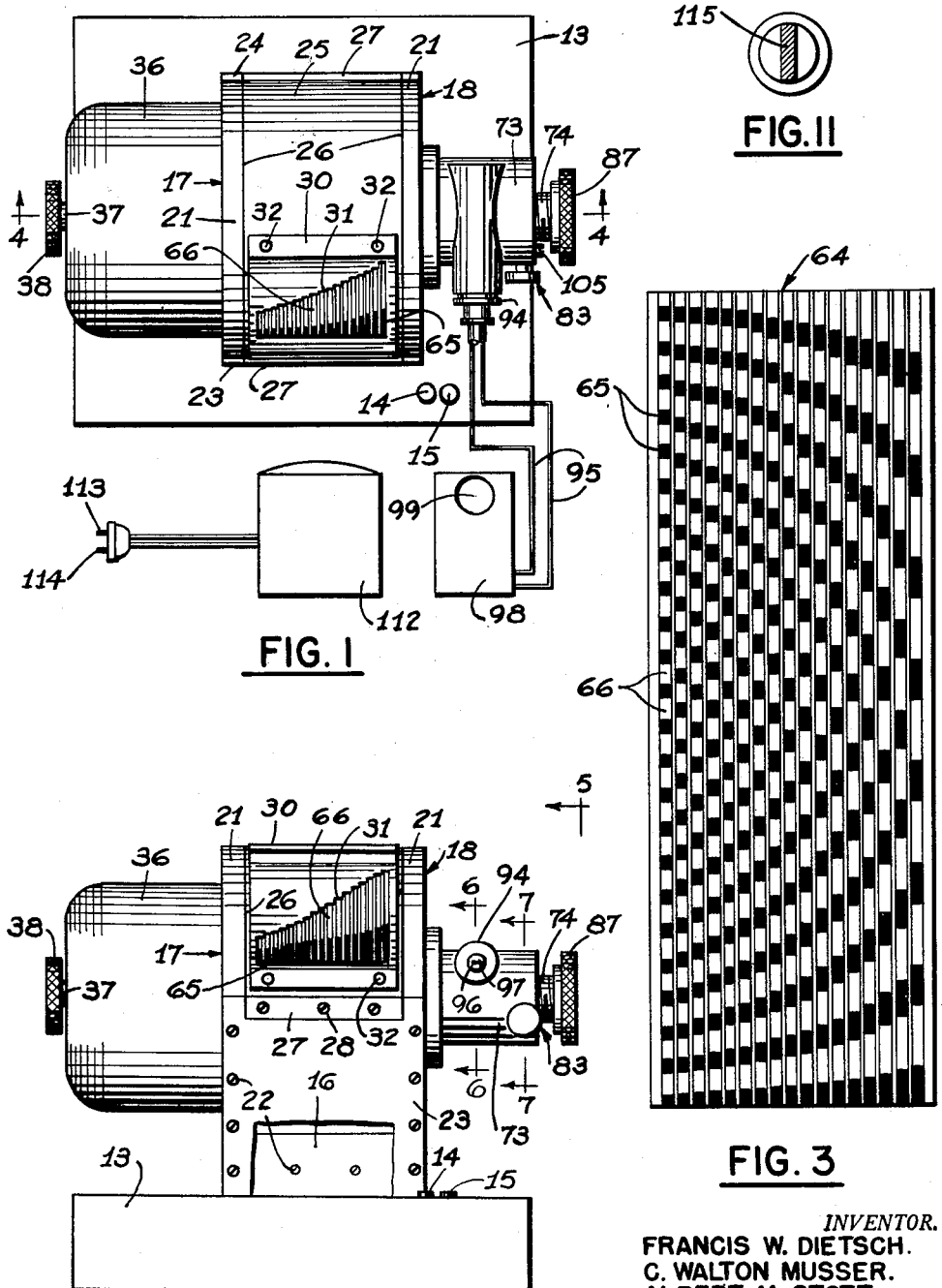
Fig. 1 is a top plan view of our testing machine and auxiliary electrical equipment associated therewith.
Fig. 2 is a side view of our kinetic torsion testing machine, the electrical accessories associated therewith having been removed.
Fig. 3 is a developed view of the periphery of our machine's flywheel, showing the nature of a block pattern thereon.
Fig. 11 is a vertical cross section taken along line 11—11 of Fig. 10 and showing further details of the aligning blade.

To facilitate a full comprehension of the construction and use of our novel machine, which is a preferred embodiment of our inventive concepts and has been chosen for illustrative purposes only, the remainder of this description will be divided into convenient headings under which pertinent components of the machine will be presented. Following presentation of the machine's components, the collective co-functioning thereof will be given.

Base, base block, cover plates, cover sheet

As shown in Figs. 1, 2, 4, and 5, our machine consists of a base 13 in which are mounted the electric switches 14 and 15. Secured to the central portion of the base's upper surface in any convenient manner (not shown) is a base block 16 (see Figs. 2, 4, and 5) to which parallel, aligned end plates 17 and 18 are secured in opposed, spaced relationship as by screws 19 (see Figs. 4 and 5). Each end plate, as shown in Fig. 5, has the straight vertical sides 20 and a rounded upper portion 21.

Affixed the straight sides of end plates 17 and 18, and to the base block 16 as by screws 22, are the front and rear cover plates 23 and 24 (see Figs. 1, 2, 4, and 5). Extending over the rounded portion of each end plate and covering the space therebetween is a curved cover sheet 25. This cover sheet is accommodated in a step 26 formed in opposing faces of the rounded portions (see Fig. 4), and is secured to the front and rear cover plates by clamp plates 27 and screws 28 (see Figs. 1 and 2). As also shown in those figures, a panel 30, having a particularly shaped window 31, is secured in an opening in the cover sheet in any convenient manner as by rivets 32. More details about this window will be given later.

Motor, armature, specimen drive plate, specimen collar, ejector rod

Secured to end plate 17, as by screws 35, is a reversible electric motor 36 having the armature 37 (see Fig. 4) whose direction of rotation is so controlled by switches 14 and 15 that depression of switch 14 causes counterclockwise rotation of the armature (as viewed in Figs. 5, 6, and 7); and depression of switch 15 causes clockwise rotation of the armature (as viewed in the same figures). As shown in Figs. 1, 2, and 4, the left end of the armature projects somewhat beyond the motor's housing, in which it is rotatably supported in any convenient manner, and is provided with a knob 38 which is secured thereon by means of a set screw 39. The right end of the armature, as shown in Fig. 4, passes through an opening in end plate 17 where it is rotatably supported by the bearing 42 and extends almost all the way across the space between end plates 17 and 18. As also shown in that figure, the right end of this armature is of unique construction and can be seen to comprise a hub 43 having the flange 44.

The hub has a stepped axial recess 45 in the inner, smaller portion of which is mounted, in any convenient manner as by screws (not shown) and dowels 46, a specimen drive plate 47 (see Fig. 4). The outer, larger portion of the stepped axial recess accommodates bearings 48 which are mounted upon and rotatably support a specimen collar 49. As is usual practice, these bearings are separated by a spacer 50 which also is mounted on the specimen collar. The bearings and spacer are secured in place by means of the snap ring 51. Extending from the bottom of stepped axial recess 45 to the armature's left end is an axial opening 52, which slidably accommodates a manually insertable and removable ejector rod 53 having the knob 54. This rod is sufficiently long to extend through the machine when fully inserted therein, but, for convenience of drawing, a portion of its length has been removed as indicated in Fig. 4.

Specimen drive plate 47, as shown in Fig. 4, is provided with a central cylindrical opening 55 having the axially extending, oppositely located grooves 56. If viewed from either end of our machine, this opening and its grooves would have the same appearance as the central opening and grooves shown in Figs. 5, 6, and 7. In fact, all of these parts will be seen to be substantially congruous when so viewed.

Specimen collar 49, which is rotatably supported within hub 43 in alignment with the specimen drive plate, extends to the right somewhat outside the hub (see Fig. 4), and at its outer end is provided with radially extending, saw tooth-like serrations 57. These serrations, as will later be shown, constitute one side of a positive acting clutch. The specimen collar, like the drive plate is also provided with an axial cylindrical opening 58 having oppositely located grooves 59. From the description thus far it can be seen that specimen drive plate 47 rotates with armature 37, but that the aligned specimen collar 49 is rotatable independent of the armature's rotation. The significance of this arrangement will become apparent later.

Flywheel and peripheral pattern

Securely fastened to the armature's flange 44, as by screws 61 and dowels 62 (one of each of which is shown in Fig. 4), is a flywheel 63. Upon the periphery of this flywheel we have provided a pattern 64 comprised of alternately contrasted colored areas (see Fig. 3). From that figure it can be seen that this pattern comprises a number of circumferential rows of the alternately contrasted colored areas, as for example black and white rectangular areas, 65 and 66, respectively. Each row contains a different number of equally spaced black areas 65, each separated by a white area 66. For example, upon examining this pattern, it will be noted that the first, or left hand, row contains twenty-four black areas. The adjacent row contains twenty-three black areas. This diminution continues in succeeding rows until the final, or right hand row, contains only eight equally spaced black areas. As will be explained later, this pattern is used in conjunction with stroboscopic light in order to determine the flywheel's initial and residual velocities. Those skilled in the art will realize that the number of rows of alternately colored areas, and the number of equally spaced black and white areas in each row can be arbitrarily chosen, depending upon the requirements to be met. Concerning the relative lengths of the black and white areas in a direction around the flywheel's periphery, we find that good results are obtained when, in each circumferential row, the length of the black areas is approximately 40% of the circular pitch (i. e., circumferential distance from one area to the next).

Window

In Figs. 1 and 2 it will be noted that window 31, earlier mentioned, exposes a portion of the flywheel's pattern to view. In addition, it can be seen that the width of the window (i. e., its dimension parallel to the machine's longitudinal axis) is substantially equivalent to the overall width of the pattern, that the lower margin (i. e., toward base 13) is straight, and that the window's upper boundary (i. e., away from base 13) has a step-like appearance. Note that each step in the window aligns with one circumferential row of the contrastingly colored areas comprising the flywheel's pattern. Therefore, the number of steps in the window's upper boundary is equivalent to the number of circumferential rows of alternately contrasted colored areas in the patterm. Since that is so, each step, if desired, can be identified by a number, a letter, or other convenient marking (not shown) in order to facilitate determination of the flywheel's angular velocity, as will later be discussed.

To further facilitate determination of the flywheel's angular velocity, the angular distance (in relation to the flywheel's axis of rotation) from the bottom of the window to each step is equivalent to the angular pitch of the colored areas in the respective circumferential rows.

Clutch housing, clutch member

Accommodated in a central opening 70 in end plate 18, to which it is secured as by means of screws 71 and dowels 72 (one of each of which is shown in Fig. 4), is a clutch housing 73 (also see Figs. 1, 2, 5, 6, and 7). This clutch housing accommodates a clutch member 74 which is mounted therein, in axial alignment with specimen collar 49, by means of bearings 75. These bearings are spaced by a dog 76, later to be described, which has spline engagement with the clutch member (see Fig. 6), and are held in place by means of a snap ring 77. As shown in Fig. 4, clutch member 74 is provided with an axial opening 78 having the oppositely located grooves 79. These grooves are substantially of the same width and depth as those in specimen drive plate 47 and specimen collar 49 in order slidably to accommodate a drive pin 67A or 67B transfixing each end of a test specimen 68, later to be described. As is evident from that figure, the axial openings in specimen drive plate 47, specimen collar 49, and clutch member 74 are in alignment and of substantially the same diameter.

The left end of clutch member 74 is provided with an enlarged portion 80 in which are cut radially extending saw tooth-like serrations 81 (see Fig. 4). These serrations, as we will later show, are engageable with the specimen collar's earlier named serrations 57 during operation of our machine and form the other side of a positive acting clutch.

Confined between the clutch member's enlarged portion 80 and the proximal bearing 75 is a coil spring 82 (see Fig. 4). As there shown, this spring acts constantly to urge clutch member 74 into engagement with specimen collar 49. However, the axial sliding of the clutch member is controlled by means of a clutch release 83 which will be described subsequently.

The right end of clutch member 74 is threaded and provided with an adjustably positioned stop collar 85 which is held in place by means of the set screw 86 (see Fig. 4). Also threadedly engaged upon the clutch member's right end is the jack knob 87 whose purpose will become apparent later.

During the use of our kinetic torsion testing machine, clutch member 74 is capable of sliding axially from left to right, or vice versa (see Figs. 1, 2, and 4). When in the left hand or engaged position (not shown) its saw tooth-like serrations 81 mate with serrations 57 in specimen collar 49; and, when in its right hand or disengaged portion (see Fig. 4), the serrations are out of engagement with the clutch collar. In addition, as will be evident later, the clutch member and its spline engaged dog are capable of limited counterclockwise rotation as viewed in Figs. 5, 6, and 7.

Dog, plunger, piezo-electric gage, oscilloscope

In Fig. 6 it can be seen that dog 76 (earlier mentioned) has a lug 90, one face 91 of which extends vertically above the axis of clutch member 74 and in contact with the inner end of a plunger 92 slidably accommodated in clutch housing 73. The opposite face of this lug rests against a set screw 89 which is threadedly positioned in clutch housing 73. The axis of plunger 92, as shown in Fig. 6, is substantially perpendicular to face 91 of the dog. The outer end of the plunger rests in contact with a calibrated piezo-electric gage 93, which is accommodated in a housing 94 threadedly connected to the clutch housing (also see Figs. 1, 2, and 5). By means of suitable wiring 95 (see Fig. 1) electrical potentials generated in the piezo-electric gage are led from its contacts 96 and 97 (see Fig. 2) to an oscilloscope 98 where their magnitude is clearly indicated on its screen 99.

Clutch release

Clutch release 83 is shown in Figs. 1, 2, 4, 5, 7, and 8. This release, consisting of a knobbed portion 100 and a shank 101, is rotatably accommodated in clutch housing 73. It is positioned, as best shown in Figs. 4 and 7, so that its axis is perpendicular and tangent to clutch member 74. The clutch release's shank 101 is provided with a flat 102 which, when in the horizontal position (see Figs. 7 and 8), will allow the clutch member to slide either way in an axial direction above it. When this same flat is in other than a horizontal position (e. g. as in Fig. 4), the clutch member is restrained from engagement with specimen collar 49.

Clutch release 83 is rotatably secured in position in the clutch housing by means of the stop screw 105 which is threadedly attached to the right end of the housing (see Figs. 1 and 8). The inner tip 106 of this stop screw engages a groove 107 (see Figs. 7 and 8) which extends for ninety degrees in the periphery of the shank's knobbed portion 100. This stop screw thus serves the twofold purpose of retaining the clutch release and of limiting the amount of its rotation. The clutch release, therefore, is capable of only ninety degrees rotation. At one extreme, that is when rotated the maximum amount in a clockwise direction as viewed in Figs. 2, 4, and 8, it is in the clutch member release position and flat 102 is in a horizontal position (see Figs. 7 and 8). At the other extreme, that is when rotated the maximum amount in a counterclockwise direction as viewed in Figs. 2, 4, and 8, it is in its clutch member blocking position, and flat 102 is then in a vertical position (see Fig. 4).

In order to accommodate clutch release 83, clutch member 74 is provided with a tangential flat 110 which extends across the clutch member in a direction perpendicular to its axis (see Figs. 4 and 7). When the clutch member is in its disengaged position this flat overlies clutch release 83 so that the release can be rotated to its locking position (see Fig. 4).

Test specimen

In Fig. 4 can be seen test specimen 68, earlier mentioned, which is about to be tested. Notice, at the left end of the specimen, that its spherical portion 69A is accommodated in the specimen drive plate's central cylindrical opening 55 and that the specimen's drive pin 67A is accommodated in opposing grooves 56. At the right end of the specimen, its spherical portion 69B is accommodated in the specimen collar's cylindrical axial opening 58 and drive pin 67B is accommodated there in opposing grooves 59. Thus, both spherical ends 69A—69B of our test specimen are supported in alignment with each other at all times during the torsion test.

A more detailed description of the uniquely shaped test specimen, per se, and of its inventive character, will be found in the copending patent application of Albert M. Stott for "Static Torsion Testing Machine and Specimen" which was filed on June 20, 1951, and bears Serial No. 232,650.

*Tubular sleeve*

To facilitate insertion of the test specimen into our machine, as well as to expedite the specimen's removal after completion of the torsion test, we provide a longitudinally "split," tubular sleeve 111 (see Fig. 4). This sleeve is formed of two longitudinal halves which fit together loosely on the test specimen to enclose completely the test portion 29 thereof. When assembled to the specimen, the tubular sleeve slidably fits the cylindrical axial openings 58 and 78. When the specimen is being inserted into our machine the sleeve prevents the specimen's drive pins from becoming snagged, as in passing from clutch member 74 to specimen collar 49 and from specimen collar 49 to specimen drive plate 47. A further advantage of sleeve 111 is derived when a broken specimen is being removed at the completion of a test by pushing it out from the left end of the machine (see Fig. 4) by means of an ejector rod 53. It is easy to see that, without our split sleeve, one broken end of the specimen might drop down into contact with the central openings, and "dig in" as it is being pushed. Such a condition would be especially aggravated if the clutch member were in its disengaged position and would hinder the specimen's removal from the machine. This mischance is obviated by our sleeve which allows the broken specimen to be pushed from the machine without difficulty.

*Operation of our machine*

Having described the structure of our inventive kinetic torsion testing machine, the mode of its operation will now be presented. For convenience of discussion, we will assume that clutch member 74 is held in its retracted position by means of clutch release 83, and that jack knob 87 has been unthreaded as far as it will go on the clutch member so that it abuts stop collar 85 (see Fig. 4). When in its retracted position, the clutch member cannot be rotated any appreciable amount in either direction because of the manner in which lug 90 of the clutch member's spline engaged dog 76 is confined between plunger 92 and set screw 89 (see Fig. 6). As will become apparent later in our description, this relationship between the lug, the plunger, and the set screw exists at all times.

In order to prepare the machine for insertion of a test specimen, grooves 59 in specimen collar 49, and grooves 56 in specimen drive plate 47 must be in alignment with grooves 79 in clutch member 74. The alignment of these grooves is accomplished by inserting our aligning blade 115 (see Fig. 10) into the clutch member's grooves 79, and pushing the blade toward the specimen drive plate until a mark 116 on the aligning blade is in registry with the right end of clutch member 74. Full insertion of the aligning blade may be facilitated by manually rotating armature 37 and its contained specimen collar 49 in either direction by means of hand knob 38. When mark 116 on the aligning blade registers with the right end of the clutch member, it indicates that all opposing grooves are in alignment with each other and the machine is ready for insertion of the test specimen.

The aligning blade is then removed from the machine and the specimen, together with split sleeve 111, is inserted into the clutch member's axial opening 78 so that the specimen's drive pins engage with grooves 79. Again the aligning blade is inserted into the clutch member and is pushed toward the left as far as the blade will go, moving the specimen before it toward specimen drive plate 47. When the test specimen is properly positioned in our machine (see Fig. 4), the specimen's left end abuts the bottom of the armature's recess 45 thereby preventing further insertion, its spherical portion 69A there being accommodated in the drive plate's central opening 55, and its corresponding drive pins 67A being accommodated in the drive plate's grooves 56. At the same time, spherical portion 69B of the specimen's right end is accommodated in the specimen collar's axial opening 58 and its drive pins 67B are accommodated in the collar's grooves 59. Full insertion of the test specimen into our machine is indicated when a second mark 117 on the aligning blade (see Fig. 10) registers with the right end of clutch member 74. After the specimen is properly located in the machine, the aligning blade is withdrawn and the actual test can be conducted in the following manner.

Electric switch 14 is depressed, thereby energizing motor 36 and causing armature 37, flywheel 63, and test specimen 68 to revolve in a counterclockwise direction as viewed from the machine's right end (see Figs. 5 to 7). With this direction of rotation, black and white areas, 65 and 66, respectively, on the periphery of the flywheel will pass window 31 traveling in a direction from top to bottom, as viewed in Fig. 2. Switch 14 is held depressed until the armature has accelerated to the initial angular velocity desired for the torsion test. This velocity is accurately determined in well known fashion by observing the appearance of the flywheel's pattern in stroboscopic light as it moves past the window. This light emanates from a stroboscope 112 which, it is assumed, has been properly connected through its leads 113 and 114 to a suitable source of electric power (not shown).

When the motor has reached the initial velocity desired for the torsion test, electric switch 14 is released, thus de-energizing the motor. However, the armature, the contained test specimen, and the attached flywheel continue to rotate at substantially the same initial velocity. In order suddenly to apply the kinetic energy of our machine to the test specimen, clutch release 83 is revolved its full extent in a clockwise direction as viewed in Figs. 2 and 4. This action rotates the release's flat 102 into parallelism with the axis of clutch member 74 and thereby removes the restraint from the clutch member so that it is immediately urged by coil spring 82 into engagement with specimen collar 49. As soon as the clutch member is free of restraint by the clutch release, the clutch member and its spline engaged dog 76 (see Fig. 6) are free for limited rotation so that the dog moves against plunger 92. The plunger, in turn, presses against piezo-electric gage 93 thereby generating an electrical potential across it When the clutch member is engaged with the specimen collar, the full torque generated by the machine is exerted on the test specimen. The right end of the specimen is restrained from free rotation only by its indirect connection to plunger 92 which, as shown in Fig. 6, is restrained from outward movement by piezo gage 93. From this explanation it can be seen that the torque on the specimen is exerted on the piezo gage. The electrical potential thereby generated is fed to the oscilloscope where its magnitude can be determined from the character of curve there produced upon the oscilloscope's screen.

While clutch member 74 is engaged with rotating specimen collar 49, the tendency is for the clutch member to be rotated in a counterclockwise direction, as viewed in Figs. 5 to 7, along with the specimen collar. This tendency is by virtue of the drive pin connection between specimen drive plate 47 and the left end of the test specimen, and by virtue of the similar drive pin connection between specimen collar 49 and the right end of the specimen (see Fig. 4). However, rotation of clutch member 74 in a counterclockwise direction (as viewed in Figs. 5 to 7) is restrained by plunger 92 which is confined between face 91 of the clutch member's dog 76 and the piezo-electric gage 93. Therefore, the torque applied to the specimen is relayed to the plunger which is urged with proportional pressure against the piezo-electric gage. The electrical potential generated across the piezo-electric gage is transmitted, as earlier mentioned, through convenient wiring to an oscilloscope where its magnitude is depicted according to its effect on the oscilloscope's electron beam.

The restraint against rotation of the specimen's right end, in contrast to continued rotation of its left end by virtue of rotation of the machine's armature, naturally results in torsional deflection or twisting of the specimen. The energy required to twist the specimen is derived from the flywheel and other attached parts whose velocity is correspondingly reduced. Variations within the physical properties of the specimen cause a change in torque. The change in torque applied through the specimen reflects in a change in potential across the piezo gage. This change across the piezo gage is transmitted to the oscilloscope and also is registered upon its screen.

From this explanation it will be evident that the vertical sweep of the oscillograph's electron beam will be influenced proportionally by the electrical potential generated from instant to instant in the piezo-electric gage; and the trace produced upon the oscilloscope's screen by its electron beam will indicate the magnitude of that potential. In other words, the trace will be an electrical representation of the torque applied through the test specimen from the instant of its inception to the final instant of its application thereto. This trace, as is well known, can be generated upon a background of co-ordinates in which the ordinates may represent torques applied to the specimen, and the abscissae may represent time or duration of application of the torque. By the use of suitable photographic equipment (not shown), the oscilloscope's trace, which constitutes a torque vs. time curve, can be reproduced on film so that a permanent record of the curve is made available for subsequent analysis or reference. By means of well known formulae, this curve can be interpolated in order accurately to evaluate the magnitude of the torque applied to the specimen, or the amount of energy consumed at any time interval during the test. In addition, torsional deflection of the specimen can be determined by photographing the flywheel's pattern by means of a high-speed camera (not shown). By noting the number of areas in any one row to pass window 31, angular deflection of the specimen can easily be determined. The trace made by the oscilloscope's electron beam is influenced by the piezo-electric gage as long as there is a change of potential across the gage, or, in other words, as long as there is a torque applied to the specimen.

When the specimen fractures, as a result of being stressed beyond its ultimate torsional strength by the energy supplied by our machine, an audible sound usually is emitted. At that instant the residual angular velocity of flywheel 63 is noted by interpreting the appearance, under stroboscopic light, of its pattern 64. Again, as in the case of the initial angular velocity, tabulated information compiled for the particular pattern and range of speeds to be encountered, will enable the machine's operator to determine quickly and accurately the residual velocity present in the flywheel.

Knowing the initial and residual velocities of the flywheel will permit the calculation, by means of well known formulae, of the torsional strength of the specimen and of the amount of energy consumed in breaking the specimen.

After failure of the test specimen, our machine can be quickly stopped in a novel and efficient manner through the use of electromagnetic energy by depressing electric switch 15. In well known manner, schematically shown in Fig. 9, the polarity of motor 36 is reversed, and armature 37 is accordingly urged to rotate in a clockwise direction (as viewed in Figs. 5 to 7). As a result of this reversal of polarity in the motor, the angular velocity of the armature which is still rotating in a counterclockwise direction, is rapidly decelerated. Just before the armature reverses the direction of its rotation, switch 15 is released. Any remaining rotative movement of the armature can be arrested by hand.

Removal of the broken specimen from the machine is accomplished quickly in the following manner. Before proceeding, however, it may be well to draw attention to the obvious fact that, in order to remove the broken specimen, grooves 56, 59, and 79 must be in alignment with each other, just as was necessary for insertion of the test specimen. If, by fortuitous circumstances, clutch member's grooves 79 happened to align with the specimen collar's grooves 59 when the clutch member snapped into engagement with the revolving specimen collar; and if specimen drive plate 47 happened to stop revolving so that its grooves 56 were aligned with the specimen collar's grooves 59, the alignment depicted in Fig. 4 would exist. In that case it would be a simple matter to push ejector rod 53 into the armature's opening 52 from left to right (see Fig. 4) until the broken test specimen and sleeve 111 emerged from the right end of the clutch member.

As invariably happens, however, clutch member 74 will not engage the rotating specimen collar so that the oppositely located grooves in each part are in alignment with each other; nor will drive plate 47 generally cease rotating with its grooves aligned with those in specimen collar 49.

Therefore, prior to removing the broken specimen, the grooves in the specimen drive plate, specimen collar, and clutch member must first be aligned. To do this we have found it is first preferable to restore the clutch member to its retracted position, thereby disengaging it from the specimen collar (see Fig. 4). Because coil spring 82, which constantly urges the clutch member into engagement with the specimen collar, is so strong, and because it may be awkward or difficult manually to pull the clutch member back far enough for it to be secured in its retracted position by revolving clutch release 83, we have provided a simple, expedient way of retracting the clutch member. To do so it is merely necessary manually to rotate jack knob 87, which is threadedly engaged with the clutch member, so that it moves away from stop collar 85. After a fraction of a turn, the inner face of the jack knob (i. e., that face toward clutch housing 73) will contact the clutch housing. Further rotation of the knob will cause the clutch member to begin moving out of engagement with specimen collar and toward the retracted position (see Fig. 4). The jack knob is turned some more, further withdrawing the clutch member, until clutch release 83 can be rotated from its released position, shown in Fig. 8, to its locked position shown in Fig. 4. When in the locked position, the clutch member has already reached its retracted position and is fully disengaged from the specimen collar. Before reusing the machine, however, jack knob 87 must be rotated back to its original position (see Fig. 4) into abutment with stop collar 85 in order to allow for subsequent re-engagement of the clutch member with the specimen collar in a later torsion test. This "backing off" of the jack knob can be done at any convenient time prior to reuse of the machine.

To continue with the process of realigning the grooves: aligning blade 115, earlier mentioned, is inserted into grooves 79 from the right end, and is pushed toward the specimen collar. If grooves 59 in the specimen collar are not aligned with the grooves in the clutch member, this condition is quickly discernible to the machine operator by noting the position of the blade's mark 117 in relation to the clutch member's outer end. To bring about alignment, the armature's hand knob 38 is rotated in either direction until the aligning blade can be moved into grooves 59.

As a final step in removing the broken specimen, ejector rod 53 is inserted from the left end of the armature's axial opening 52 (see Fig. 4) and is lightly pushed toward the right, meanwhile rotating the armature by means of knob 38 until the drive plate's grooves come into alignment with those in the specimen collar. When that happens, the broken specimen, enclosed in sleeve 111, can be ejected from the right end of the clutch member after the aligning blade is removed therefrom.

Summary

The extent and precision of the measurements available from the use of our machine are of incalculable value in the analytical study of kinetic torsion. In addition, our inventive kinetic torsion machine provides those engaged in such study with an instrument of unprecedented superiority which will, no doubt, open new avenues of approach to the solution of problems heretofore without answer.

From the foregoing it will be apparent to those skilled in the art that we have provided a kinetic torsion testing machine in which the specimen to be tested is not preloaded by clamping or other means of placing it into testing position in the machine, that we have provided a kinetic torsion testing machine in which both ends of the specimen are supported in alignment with each other at all times, that we have provided a kinetic torsion testing machine in which there is line contact and universal-joint action between the machine and the ends of the specimen, that we have provided a kinetic torsion testing machine having stroboscopic means for determining the initial and residual velocities of the machine's flywheel, that we have provided a kinetic torsion testing machine having piezoelectric means for determining the character of the torsional moment applied to the specimen and the amount of flywheel energy absorbed by the specimen at any instant during the test; and, that we have provided a kinetic torsion testing machine in which the specimen is subjected only to torsional stress and strain.

Because numerous variations and modifications of our inventive machine are possible without departing from its original spirit and scope, we do not wish to be limited in the protection of patent coverage by the narrow confines of the single embodiment here disclosed for illustrative purposes only, but rather, only by the breadth and scope of the appended claims.

We claim:

1. A kinetic torsion testing machine for analyzing the physical properties of an elongated test specimen, comprising: a base, an upright plate secured to said base, an armature having an axial recess in one end thereof and rotatably mounted in said upright plate so as to extend beyond opposite surfaces thereof, means for rotating said armature, a specimen drive plate mounted in the axial recess of said armature to rotate concentrically therewith, a specimen collar rotatably mounted in said armature's recess axially aligned and juxtaposed with said drive plate but independent of the drive plate's rotation, said collar removably accommodating therein for rotation therewith one end of the elongated specimen to be tested, the other end of which is removably mounted in and rotatably driven by said drive plate, a flywheel secured to said armature, means for abruptly arresting the rotation of said collar and its contained test specimen end whereby to cause a torsional impact to be applied to the test specimen and resultant fracture thereof by the continuing rotation of said armature, its attached drive plate and contained other end of the test specimen, and means for measuring the change in angular velocity of said flywheel before and after the specimen is fractured so that the specimen's torsional strength and the amount of energy consumed in breaking the specimen may be determined.

2. A kinetic torsion testing machine for analyzing the physical properties of an elongated test specimen, comprising: a base, an upright end plate secured to said base, an armature having an axial recess in one end thereof and rotatably mounted in said upright plate so as to extend beyond opposite surfaces thereof, a specimen drive plate mounted in the armature's axial recess so as to rotate in unison with said armature, a specimen collar rotatably mounted in the armature's axial recess axially aligned and juxtaposed with said specimen drive plate but independent of the drive plate's rotation, said collar removably accommodating therein for rotation therewith one end of the elongated specimen to be tested, the other end of which is removably mounted in and rotatably driven by said drive plate, a flywheel secured to said armature, a pattern of different colored areas on the flywheel's periphery, electrically operated means for rotating said armature, a stroboscope for use in connection with said pattern to determine the flywheel's angular velocity, and means for abruptly arresting the rotation of said collar and the end of said specimen contained therein whereby to cause a torsional impact to be applied to the test specimen by the continuing rotation of said armature, the attached specimen drive plate and its contained other end of the test specimen.

3. In a kinetic torsion testing machine for analyzing the physical properties of an elongated test specimen, the combination of an armature having an axial recess in one end thereof, a specimen drive plate mounted in the axial recess of said armature to rotate concentrically therewith, a flywheel secured to said armature for rotation therewith and having an axial recess aligned with the armature's recess, a specimen collar rotatably mounted in said flywheel in axial alignment with said specimen drive plate but independent of the drive plate's and the flywheel's rotation, said collar removably accommodating therein for rotation therewith one end of the elongated specimen to be tested, the other end of which is removably mounted in and rotatably driven by said drive plate, means for rotating said armature and flywheel together with their said contained specimen drive plate and specimen collar as well as the test specimen carried thereby, and means for abruptly arresting the rotation of said specimen collar and its contained test specimen end, whereby to cause a torsional impact to be applied to the test specimen by the continuing rotation of said armature, its attached drive plate and contained other end of the test specimen.

4. In combination, a kinetic torsion testing machine having a power driving source, a flywheel rotatably driven by said power driving source, a first holding means carried by said flywheel for rotation therewith and for rotatably supporting one end of a longitudinal test specimen, a second holding means carried by said flywheel but free to rotate independently thereof and non-rotatably supporting the other end of the test specimen, a pattern of different colored areas on said flywheel's periphery, means for abruptly stopping rotation of said second holding means so as to cause application of a torsional impact to the specimen and fracture thereof as said first holding means continues to be rotated, and stroboscopic means focused on said pattern for determining the flywheel's velocity before and after specimen fracture, whereby to ascertain the specimen's torsional strength.

5. In combination, a kinetic torsion testing machine having a power driving source, a flywheel rotatably driven by said power driving source, a first holding means carried by said flywheel for rotation therewith and non-rotatably supporting one end of a longitudinal test specimen, a second holding means carried by said flywheel but free to rotate independently thereof and non-rotatably supporting the other end of the test specimen, clutch means for abruptly stopping rotation of said second holding means so as to cause application of a torsional impact to the specimen and fracture thereof as said first holding means continues to be rotated, a piezo-electric gage, a plunger having one end in contact with said clutch means and the other end in contact with said piezo-electric gage so that the torsional moment exerted upon applying said clutch means may be indicated by said gage, and an oscilloscope connected to said piezo-electric gage for establishing a visual record of the torsional moment exerted upon the test specimen and indicated by the gage.

6. In combination, a kinetic torsion testing machine having a power driving source, a flywheel rotatably driven by said power driving source, a first holding means carried by said flywheel for rotation therewith and non-rotatably supporting one end of a longitudinal test specimen, a second holding means carried by said flywheel but free to rotate independently thereof and non-rotatably supporting the other end of the test specimen, a pattern of different colored areas on said flywheel's periphery, clutch means for abruptly stopping rotation of said second holding means so as to cause application of a torsional impact to the specimen and fracture thereof as said first holding means continues to be rotated, stroboscopic means focused on said pattern for determining the flywheel's velocity before and after specimen fracture, a piezo-electric gage, a plunger having one end in contact with said clutch means and the other end in contact with said piezo-electric gage so that the torsional moment exerted upon applying said clutch means may be indicated by said gage, and an oscilloscope connected to said piezo-electric gage for establishing a visual record of the torsional moment exerted upon the test specimen and indicated by the gage, whereby the torsional strength of the specimen and the amount of energy consumed in effecting its fracture may be determined.

FRANCIS W. DIETSCH.
C. WALTON MUSSER.
ALBERT M. STOTT.

REFERENCES CITED

The following references are of record in the file of this patent:

UNITED STATES PATENTS

| Number | Name | Date |
| --- | --- | --- |
| 1,828,564 | Hardesty | Oct. 20, 1931 |
| 1,930,905 | Nicholson | Oct. 17, 1933 |
| 2,042,231 | Lewis | May 26, 1936 |
| 2,302,496 | Gasser | Nov. 17, 1942 |
| 2,415,215 | Mayberry | Feb. 4, 1947 |
| 2,496,420 | Stern | Feb. 7, 1950 |